US005283710A

United States Patent [19]

Hamilton et al.

[11] Patent Number: 5,283,710

[45] Date of Patent: Feb. 1, 1994

[54] ELECTROSTATIC DISCHARGE SHIELD FOR SWITCHES

[75] Inventors: Charles S. Hamilton, Bountiful; Michael Johnson, Ogden; David Jones, North Layton, all of Utah

[73] Assignee: Iomega Corporation, Roy, Utah

[21] Appl. No.: 24,828

[22] Filed: Mar. 1, 1993

Related U.S. Application Data

[63] Continuation of Ser. No. 620,281, Nov. 30, 1990, abandoned.

[51] Int. Cl.[5] .......................... H05F 3/02; H02H 1/04

[52] U.S. Cl. .................................. 361/212; 200/305; 361/220

[58] Field of Search ............... 361/212, 216, 217, 220; 307/326; 200/304, 305, 295, 296, 11 TW, 566

[56] References Cited

U.S. PATENT DOCUMENTS

| | | | |
|---|---|---|---|
| 3,621,164 | 11/1971 | Backer | 361/220 |
| 3,780,345 | 12/1973 | Earman, Jr. | 361/220 |
| 4,745,517 | 5/1988 | Pitts | 361/212 |
| 4,800,374 | 1/1989 | Jacobson | 361/212 |
| 4,809,044 | 2/1989 | Pryor et al. | 357/2 |
| 4,814,566 | 3/1989 | Sigl | 361/212 |
| 4,868,702 | 9/1989 | Itou et al. | 361/42 |
| 5,210,395 | 5/1993 | Freeman | 361/212 |

*Primary Examiner*—A. D. Pellinen
*Assistant Examiner*—Richard T. Elms
*Attorney, Agent, or Firm*—Woodcock Washburn Kurtz Mackiewicz & Norris

[57] ABSTRACT

An electro-static discharge shield on the external non-finger contact surface of a switch makes a contact between the shield itself and the grounded chassis. Since the shield has substantially lower resistance than the surface or inner circuitry of the switch, external electrostatic discharge introduced on the surface of the switch flows through the shield to ground via the grounded chassis to prevent destruction or interruption of the circuit.

18 Claims, 3 Drawing Sheets

FIG. I

ELECTROSTATIC DISCHARGE SHIELD FOR SWITCHES

This is a continuation of application Ser. No. 620,281, filed Nov. 30, 1990 now abandoned.

BACKGROUND OF THE INVENTION

The invention relates to an apparatus which substantially eliminates the risk of interrupting or destroying an electrical circuit by external electro-static discharge through a switch. Any electrical circuit that operates at low voltage, such as one in computer systems, faces a risk of damage or interruption by accidental introduction of high-voltage electro-static discharge through a switch. Many computer systems operate under 12 volts, while external electro-static discharge by a human operator may be up to 15000 volts. An introduction of such high voltage to an electric circuit often takes place when a human operator with static charge touches a switch of the electric device. Although such static discharge is instantaneous, sufficiently high voltage rushes through the switch and reaches the internal circuit. As a result, the operation of the internal circuit is interrupted, and the circuit may be destroyed.

In the relevant prior art, an electrical circuit is protected by a grounded chassis. In U.S. Pat. No. 4,868,702 a plurality of circuit blocks are protected by the ground circuit apparatus which includes the grounded chassis. Such chassis physically separates an internal circuit from the external electro-static discharge. Some semiconductor devices are also protected by the built-in overvoltage protection mechanism such as in U.S. Pat. No. 4,809,044.

In protecting the circuit from electro-static discharge by personnel, U.S. Pat. No. 4,800,374 teaches the use of a wrist anti-static device. Assembly workers or repairmen wear this device to ground themselves to prevent a damage to the circuit due to electro-static discharge. It is not practical for end-users to wear such device every time that they operate an electrical device.

In every day-operation, a switch is a portion of an electrical system where an undesirable external high voltage is introduced. Although a switch is often mounted on the grounded chassis, high voltage due to electro-static discharge on the surface of switch is not directly shielded to ground. Thus, the relevant prior art does not address the problem of high voltage introduced to the surface of the switch in protecting the internal electric circuit.

SUMMARY OF THE INVENTION

The electro-static discharge shield of the current invention is designed to substantially eliminate the risk of destroying or interrupting the operation of an electrical circuit by external electro-static discharge through a switch. The electro-static discharge shield has substantially lower resistance to chassis ground than to the surface or internal circuitry of the switch. The shield is disposed on the external surface of the switch, and a part of the shield contacts the grounded chassis. The switch is snapped into the bore of the grounded chassis and locked in the mounted position to maintain the contact by the side bezel until the switch is dismounted from the chassis. The combination of the electro-static discharge shield and the grounded chassis provides a path to ground of lesser resistance than the internal circuitry of the switch. Thus, it is highly unlikely that undesirable high voltage on the switch surface reaches the electric circuit.

It is an object of the invention to protect an electrical circuit by disposing an electro-static shield on the surface of a switch to provide a path of lesser resistance to ground.

It is another object of the invention to provide a shield which is easily assembled on the switch by an adhesive side.

It is yet another object of the invention to provide a shield that does not alter the appearance of the switch.

DESCRIPTION OF A PREFERRED EMBODIMENT

The electro-static discharge shield in accordance with a presently preferred exemplary embodiment of the invention will be described below with reference to FIGS. 1 through 6. The invention is described with a binary coded decimal pushwheel switch; however, it will be recognized by those skilled in the art that the technique of the invention may be used on other types of switches whereby undesirable external static discharge is bypassed to ground. Thus, the description given herein is for exemplary purposes only and is not intended in any way to limit the scope of the invention.

Figure 1:
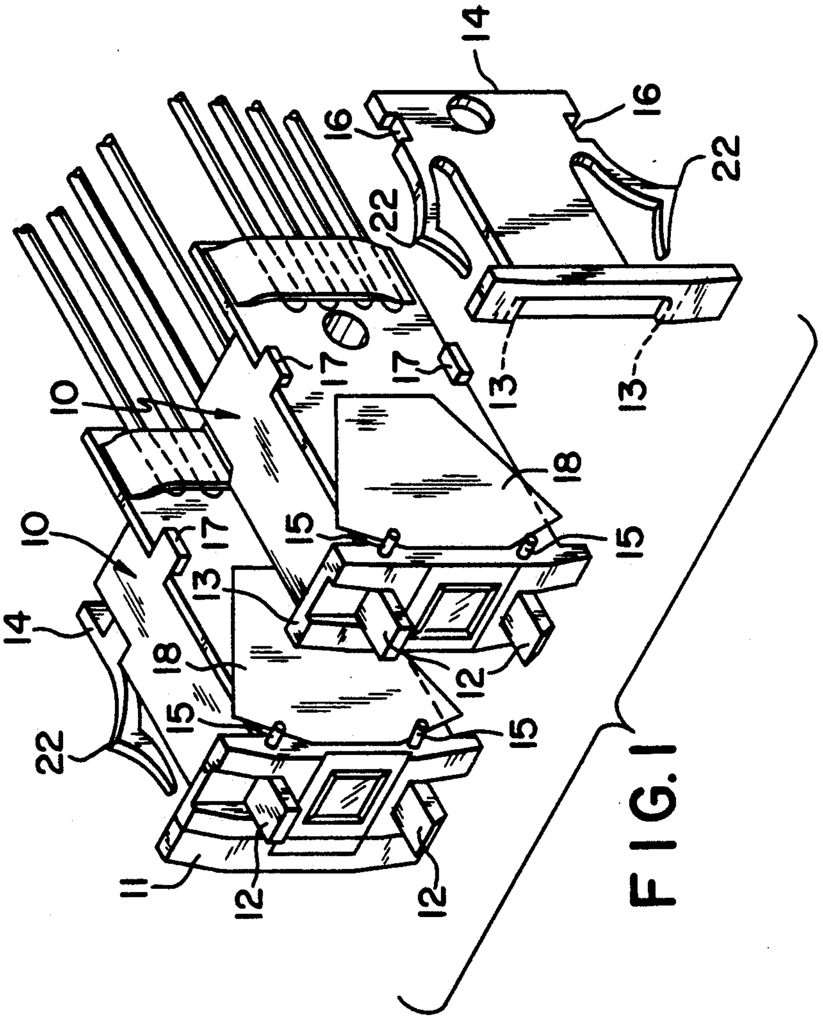
FIG. 1 is a drawing of components of a preferred embodiment showing two switches, two shields, and two side bezels on one side of the switch.

FIG. 1 shows binary coded decimal pushwheel switches which, for example are used to select two SCSI (Small Computer System Interface) ID. (These switches are functionally equivalent to thumbwheel switches to which the invention is also applicable). A switch 10 has a finger contact surface which comprises a face 11 and switch buttons 12. A non-finger contact surface is any surface area of the switch other than the finger contact surface. Cylindrical depressions 13 of a side bezel 14 latch onto pins 15 on the side surface of the switch 10. The side bezel 14 also has rectangular depressions 16 which fit latches 17 on the switch 10. An electro-static discharge shield 18 is placed between the side surface of the switch 10 and the bezel 14. The shield 18 has an adhesive surface 19 (FIG. 5) to stick to a part of the external surface of the switch 10.

Figure 2:
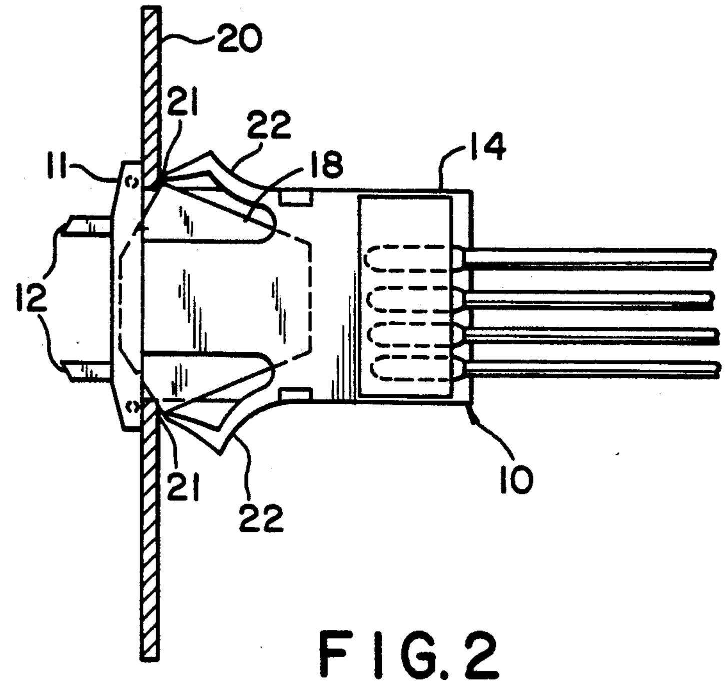
FIG. 2 is a side view of a preferred embodiment in relation to a grounded conductive chassis. The electro-static discharge shield and bezel are assembled on the switch and mounted on the grounded chassis.

FIG. 2 shows a cross-sectional view of the switch 10 and grounded chassis 20. When the switch 10 is mounted on the grounded chassis 20, the side bezel 14 snaps in to lock the switch 10 in position. In this position, the contact area 21 of the electro-static discharge shield 18 maintains a contact with the grounded chassis 20. The position is secured until the switch 10 is dismounted by depressing arm lock 22 of the side bezel 14 to unlock the bezel.

In the mounted position, the electro-static discharge shield 18 and the grounded chassis 20 provide a path to ground with lesser resistance than the internal circuitry of the switch. This is because the shield 18 and the grounded chassis 20 are conductive materials, while the switch 10 is not. Thus, for example when an operator discharges undesirable static charge on the surface of switch face 11 while he or she is depressing a switch button 12 the charge conducts through the path of lesser resistance to ground via air and electro-static shield 18 rather than through the switch to the internal circuit.

The side of the switch that is closest to the circuit is covered by the electro-static discharge shield 18. Covering only the sides on the switch surface is sufficient to protect the circuit to which a switch is connected to or any other circuits that are in the physical vicinity of the switch.

Figure 3:
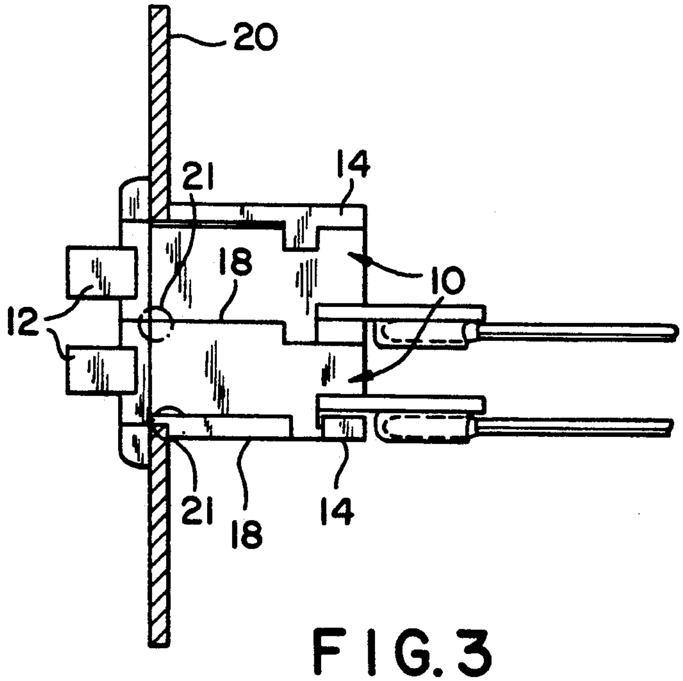
FIG. 3 is a top view of two switches mounted on the grounded chassis with shields in place.

FIG. 3 shows a top view of two switches in the mounted position. The contact area 21 of the shield 18 touches the grounded chassis 20.

Figure 4:
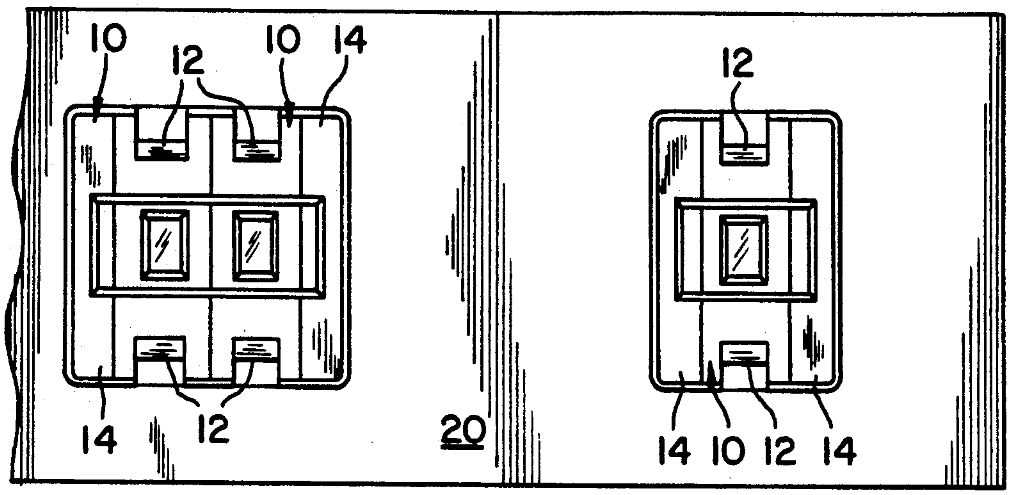
FIG. 4 shows an example of how switches can be arranged on the chassis.

FIG. 4 shows how a plurality of switches 10 can be mounted on a single grounded chassis 20. Each switch is covered with the electro-static discharge shield, and each shield has contact with the grounded chassis. Since each switch assembly is effectively and independently shielding the circuit from external electro-static discharge, relative locations of these switches on the grounded chassis do not matter, as shown in FIG. 4.

The current invention preserves the cosmetic appearance of a switch. Because the shield 18 is hidden by the switch and the chassis 20, the aesthetic appearance of the existing switch is not altered as shown in FIG. 4. The appropriately sized electro-static discharge shield can be placed on most switches without altering the appearance.

Figure 5:
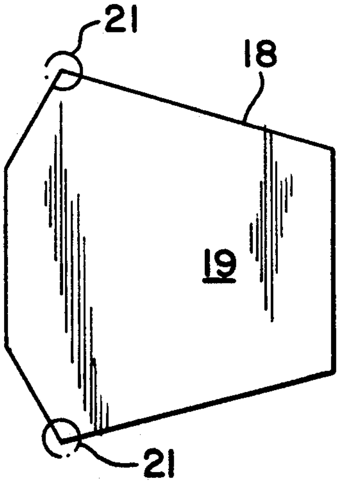
FIG. 5 is one embodiment of the electro-static discharge shield.
Figure 6:
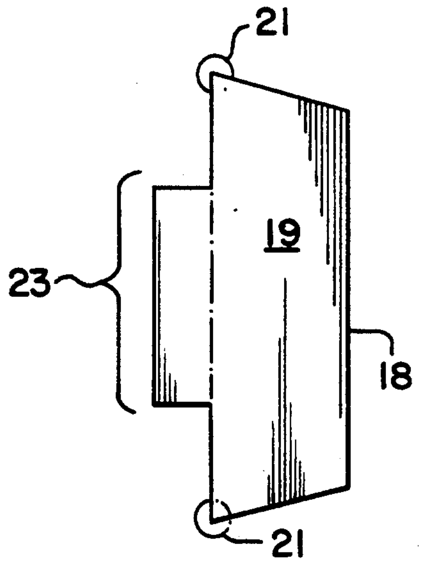
FIG. 6 shows another embodiment of the electro-static discharge shield.

FIGS. 5 and 6 show two different embodiments of the electro-static discharge shield 18. The two embodiments of FIGS. 5 and 6 have the contact area 21 which extends from the edge of the side surface of switch 10 to contact the grounded chassis 20. FIG. 6 also shows the fringe area 23 which is folded 90° and goes underneath the face 11 of the switch 10. The area 23 provides a closer path of lesser resistance to an operator who discharges electro-static discharge while depressing the push button 12.

Those skilled in the art will readily appreciate that many additional modifications are possible in the exemplary embodiment without materially departing from the novel teachings and advantages of this invention. For example, the shield shape and position can be modified. Accordingly, all such modifications are intended to be included within the scope of the invention as defined in the following claims.

What is claimed is:

1. Apparatus for protecting electric circuitry from external electro-static discharge comprising:

a switch operatively coupled to said electronic circuitry, said switch having at least one finger contact outer surface where an operator touches and at least one non-finger contact outer surface where said operator does not tough during normal switch operation; and an electro-static discharge shield disposed on said non-finger contact outer surface, said discharge shield being sufficiently close to said finger contact outer surface for providing a substantially lower resistance path than other alternate paths on said switch when said operator touches said finger contact outer surface, whereby said substantially lower resistance path reduces the risk of interrupting the operation of said electric circuitry by electro-static discharge.

2. Apparatus according to claim 1 further comprising:

a grounded conductive chassis which physically protects said electric circuitry; and means to secure contact between a first portion of said electro-static discharge shield and said grounded conductive chassis, said first portion defining a contact area, said means maintaining the contact until said switch is dismounted.

3. Apparatus according to claim 2 wherein an external electro-static discharge on said switch conducts through said electro-static discharge shield to ground via said contact area and said grounded conductive chassis.

4. Apparatus according to claim 2 wherein said securing means is a side bezel that snaps said switch onto said grounded conductive chassis and retains the same position for said contact area to maintain the contact with said grounded conductive chassis.

5. Apparatus according to claim 3 wherein a plurality of said switches are juxtaposed, each switch having said electro-static discharge shield contacting said grounded conductive chassis at said contact area.

6. Apparatus according to claim 1 wherein said switch is used to select a SCSI (Small Computer System Interface) ID.

7. Apparatus according to claim 1 wherein said electro-static discharge shield is placed by means of an adhesive surface on said electro-static discharge shield.

8. Apparatus according to claim 1 wherein said electro-static discharge shield is substantially hidden from view when said switch is mounted on said grounded conductive chassis.

9. Apparatus for protecting electric circuitry from external electro-static discharge comprising:

a switch operatively coupled to said electronic circuitry, said switch having at least one finger contact outer surface where an operator touches and at least one non-finger contact outer surface where said operator does not tough during normal switch operation, said finger contact surface and said non-finger contact surface being perpendicular to each other; and an adhesive electro-static discharge shield disposed on said non-finger contact surface, said discharge shield providing a substantially lower resistance path than other alternate paths on said switch when said operator touches said finger contact surface, whereby said substantially lower resistance path reduces a risk of interrupting the operation of said electric circuitry by electro-static discharge from said operator.

10. Apparatus according to claim 9 further comprising:

a grounded conductive chassis which physically protects said electric circuitry; and means to secure the contact between a first portion of said electro-static discharge shield and said grounded conductive chassis, said first portion defining a contact area, said means maintaining the contact until said switch is dismounted.

11. Apparatus according to claim 10 wherein said electro-static discharge shield has a second portion which is folded 90° to cover a first portion of said finger contact surface, said second portion defining a fringe area.

12. Apparatus according to claim 11 wherein an external electro-static discharge on said switch conducts through said elector-static discharge shield via said fringe area and said contact area to ground via said grounded conductive chassis.

13. Apparatus according to claim 10 wherein said discharge shield is disposed sufficiently close to said finger contact surface, an external electro-static discharge on said switch conducting through said electro-static discharge shield to ground via said contact area and said grounded conductive chassis.

14. Apparatus according to claim 10 wherein said securing means is a side bezel that snaps said switch onto said grounded conductive chassis and retains the same position for said contact area to maintain the contact with said grounded conductive chassis.

15. Apparatus according to claim 10 wherein a plurality of said switches are juxtaposed, each switch having said electro-static discharge shield contacting said grounded conductive chassis at said contact area.

16. Apparatus for protecting electric circuitry from external electro-static discharge comprising:

a first switch operatively coupled to said electronic circuitry, said first switch having at least one finger contact outer surface where an operator touches and at least one non-finger contact outer surface where said operator does not touch during a normal switch operation, said finger contact outer surface and said non-finger contact outer surface being perpendicular with each other;

a second switch of the same type as said first switch being placed in contact with said first switch on said non-finger contact outer surface; and an electro-static discharge shield disposed between said first switch and said second switch on said non-finger contact outer surface, said discharge shield being sufficiently close to said finger contact outer surface for providing a substantially lower resistance path than other alternate paths ion said first and second switches when said operator touches said finger contact outer surface, whereby said substantially lower resistance path reduces a risk of interrupting the operation of said electric circuitry by electro-static discharge.

17. Apparatus according to claim 16 further comprising:

a grounded conductive chassis which physically protects said electric circuitry; and means to secure the contact between a first portion of said electro-static discharge shield and said grounded conductive chassis, said first portion defining a contact area, said means maintaining the contact until said first or second switch is dismounted.

18. Apparatus according to claim 17 wherein an external electro-static discharge on said first or second switch conducts through said electro-static discharge shield to ground via said contact area and said grounded conductive chassis.

* * * * *

UNITED STATES PATENT AND TRADEMARK OFFICE
CERTIFICATE OF CORRECTION

PATENT NO. : 5,283,710

DATED : February 1, 1994

INVENTOR(S) : Charles S. Hamilton, Michael Johnson, & David Jones

It is certified that error appears in the above-identified patent and that said Letters Patent is hereby corrected as shown below:

Col. 3, line 62, delete "tough" and substitute therefor --touch--.

Col. 4, line 44, delete "tough" and substitute therefor --touch--.

Signed and Sealed this

Twenty-eighth Day of June, 1994

Attest:

BRUCE LEHMAN

*Attesting Officer*

*Commissioner of Patents and Trademarks*